J. B. HENDRICKS.
Axle Box.
No. 94,823. Patented Sept. 14, 1869.
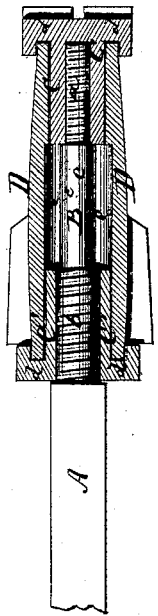
Witnesses:
Inventor:
J. B. Hendricks
per Munn & Co
Attorneys.

United States Patent Office.

JAMES B. HENDRICKS, OF CLAYTON, ILLINOIS.

Letters Patent No. 94,823, dated September 14, 1869.

IMPROVED AXLE-BOX.

The Schedule referred to in these Letters Patent and making part of the same.

To all whom it may concern:

Be it known that I, JAMES B. HENDRICKS, of Clayton, in the county of Adams, and State of Illinois, have invented a new and improved Axle-Box; and I do hereby declare that the following is a full, clear, and exact description thereof, which will enable others skilled in the art to make and use the same, reference being had to the accompanying drawing, forming part of this specification.

The drawing represents a longitudinal section of my improved axle-box.

This invention relates to a new axle-box for carriages, buggies, and all other wheeled vehicles which have stationary axles, and has for its object to provide simpler and more durable supports for the wheels than were heretofore provided.

The invention consists in the arrangement of double bearings, which are fitted upon the spindle, and which have grooved projecting flanges, that retain the ends of the box in place. Between the bearings is, within the box and around the spindle, an annular chamber, which is filled with cotton, or other material, soaked with oil.

A, in the drawing, represents the axle, having at its end the spindle B, upon which the wheel is hung.

The spindle has a screw-thread, $a$, near its end, and another screw-thread, $b$, near its shoulder, on the axle, and a plain smooth portion between both screw-threads.

Upon the screw-portions $a$ $b$, of the spindle, are fitted the brass bearings C C', which have flanges $d$ $d$ at their outer ends, as shown.

These flanges are grooved, to receive the ends of the axle-box D, as shown. Washers may, if desired, be put into the grooves. The annular chamber $e$, formed within the box D, between the bearings, is filled with cotton, or other porous material, which is soaked in oil. The oil is prevented from escaping by the grooves in the flanges $d$, and more so yet, if washers are put into the same.

The wheels will work quite easily between the stationary bearings. They can be easily taken off by removing the outer bearing C, which has grooves at the ends, so that it can be turned by means of a bar of sufficient length and width.

Having thus described my invention,

I claim as new, and desire to secure by Letters Patent—

The combination with the spindle, which has the double screw-thread, of the bearings C C', which have grooved flanges $d$, to receive the ends of the axle-box, substantially as herein shown and described.

JAS. B. HENDRICKS.

Witnesses:
E. LOYD,
J. O. MILLER.